United States Patent
Welsh et al.

(10) Patent No.: US 7,646,865 B2
(45) Date of Patent: Jan. 12, 2010

(54) TELEPHONE HANDSET COUPLING SYSTEM

(75) Inventors: Christopher Todd Welsh, Fishers, IN (US); Alan D. Michel, Fishers, IN (US); Michael Thomas Frank, Fishers, IN (US); John Charles Baumhauer, Jr., Indianapolis, IN (US); Larry Allen Marcus, Fishers, IN (US)

(73) Assignee: MWM Acoustics, LLC, Indianapolis, IN (US)

( * ) Notice: Subject to any disclaimer, the term of this patent is extended or adjusted under 35 U.S.C. 154(b) by 478 days.

(21) Appl. No.: 11/807,470

(22) Filed: May 26, 2007

(65) Prior Publication Data

US 2008/0292066 A1    Nov. 27, 2008

(51) Int. Cl.
  *H04M 1/00* (2006.01)
  *H04M 9/00* (2006.01)
  *H04M 11/00* (2006.01)

(52) U.S. Cl. .................. 379/433.01; 379/52

(58) Field of Classification Search ............ 379/433.01, 379/433.02, 443, 444, 52, 55.1; 381/312, 381/331, 406, 71.6
See application file for complete search history.

(56) References Cited

U.S. PATENT DOCUMENTS

| 4,529,846 A * | 7/1985 | Freeman et al. ............. 381/406 |
| 5,740,257 A | 4/1998 | Marcus |
| 7,584,010 B2 * | 9/2009 | Waldron et al. ............... 700/94 |
| 2004/0252812 A1 * | 12/2004 | Waldron et al. ............... 379/52 |
| 2006/0126873 A1 * | 6/2006 | Lee ........................... 381/312 |

* cited by examiner

*Primary Examiner*—Tuan D Nguyen
(74) *Attorney, Agent, or Firm*—Patent Law Office of David G. Beck

(57) ABSTRACT

A telephone handset that includes both a speaker and a secondary flux coil is provided. The secondary flux coil provides improved inductive coupling between the handset and a hearing aid. Due to the wiring configuration of the handset, the speaker and the secondary flux coil can be independently filtered, thus providing means for independently optimizing the performance of both the speaker and the secondary flux coil. Suitable filters include both passive circuits and digital signal processors.

20 Claims, 4 Drawing Sheets

TELEPHONE HANDSET COUPLING SYSTEM

FIELD OF THE INVENTION

The present invention relates generally to telephone handsets and, more particularly, to a handset for use with an inductively coupled hearing aid.

BACKGROUND OF THE INVENTION

In general, a person who is hearing impaired and who uses a conventional hearing aid can use a telephone handset in one of two modes. In one mode of operation, they use the telephone handset in a conventional manner, allowing the acoustic sound waves emitted by the handset's speaker (also referred to as a receiver) to be picked up by the hearing aid's microphone in the same way that the hearing aid's microphone would pick up the sound of an external source (e.g., another person in the same room). The hearing aid then converts the acoustic sound waves to an electrical signal that is processed prior to being converted back to sound waves and broadcast to the user via the hearing aid's speaker (also referred to as a receiver). In the second mode of operation, the hearing aid uses an electromagnetic induction coil to pick up an electromagnetic signal that corresponds to the acoustic sound waves produced by the telephone handset. The induction coil, which is typically integrated within the hearing aid, generates an electrical signal that is then processed by the hearing aid and converted to acoustic sound waves that are broadcast to the user. The hearing aid may include means for the user to select which mode of operation they prefer, acoustic or electromagnetic.

In recent years, a number of companies have undertaken efforts to improve upon the quality, performance and usability of telephone coupled hearing aids. In general, these efforts have been directed at four specific areas. First, various methods have been proposed to increase the strength of the electromagnetic signal produced by the handset. Many of these methods use a secondary flux coil, both as a means of increasing the electromagnetic signal and as a means of providing additional mounting flexibility. Second, a number of techniques have been used to improve upon the sensitivity of the induction coil that is integrated into the hearing aid. Third, improvements in signal processing, for example the use of multi-band digital signal processors, continue to improve upon the overall quality of the sound produced by the hearing aid. Fourth, a number of user convenience features such as automated mode switching have provided hearing aid users with a more user-friendly device.

Although a number of developments have been made that improve the sound quality and coupling efficiency of a hearing aid when used with a telephone handset, many users still find the performance inadequate. As a result, many people with hearing disabilities are unable, or unwilling, to use a conventional telephone. Accordingly, what is needed in the art is a telephone that can provide a hearing disabled person with improved performance when electromagnetically coupled to their hearing aid. The present invention provides such a system.

SUMMARY OF THE INVENTION

The present invention provides a telephone handset that includes both a speaker and a secondary flux coil. The secondary flux coil provides improved inductive coupling between the handset and a hearing aid. Due to the wiring configuration of the handset, the speaker and the secondary flux coil can be independently filtered, thus providing means for independently optimizing the performance of both the speaker and the secondary flux coil. Suitable filters include both passive circuits and digital signal processors.

In one embodiment of the invention, a first pair of signal lines is connected to the handset speaker and a second pair of signal lines is connected to the secondary flux coil. A filter is electrically connected to the speaker and can be used to alter the input signal to the speaker without altering the input signal to the secondary flux coil. The filter can be connected in series or in parallel with the speaker.

In another embodiment of the invention, a first pair of signal lines is connected to the handset speaker and a second pair of signal lines is connected to the secondary flux coil. A filter is electrically connected to the secondary flux coil and can be used to alter the input signal to the secondary flux coil without altering the input signal to the speaker. The filter can be connected in series or in parallel with the secondary flux coil.

A further understanding of the nature and advantages of the present invention may be realized by reference to the remaining portions of the specification and the drawings.

DESCRIPTION OF THE SPECIFIC EMBODIMENTS

Figure 1:
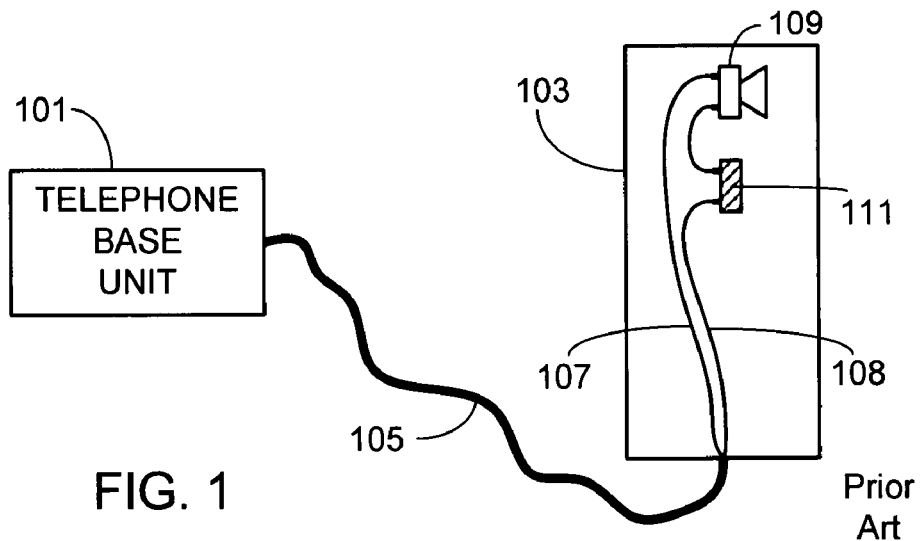
FIG. 1 illustrates a prior art technique of serially connecting a secondary flux coil to a speaker within a telephone handset.

FIG. 1 illustrates a prior art technique for improving the performance of a conventional landline telephone with respect to the ability of the telephone's handset to couple to a hearing aid. As shown, the telephone base unit 101 is coupled to the telephone handset 103 using a standard four-wire cable 105. A pair of signal lines 107/108 within cable 105 connects base unit 101 to the speaker 109 within the handset. Speaker 109 is commonly comprised of a voice coil, a permanent magnet and a speaker cone. In some embodiments speaker 109 is comprised of an armature driver. The voice coil within speaker 109, in response to the time-varying component of the electric signals received via signal wires 107/108, generates a time-varying magnetic field which, in turn, causes the movement of the speaker cone and the production of acoustic sound waves. The same time-varying magnetic field can also be used to couple directly to an inductive coil within, or coupled to, a hearing aid, thereby allowing the hearing aid user to receive input directly from the telephone. As a result of this direct coupling mechanism, the hearing aid user no longer must discriminate between information received from the telephone handset and background noise, an additional step that is often difficult for a person with a hearing disability.

In order to improve the inductive coupling between the handset and the hearing aid, a handset will often include a secondary flux coil 111. Secondary flux coil 111 serves multiple purposes. First, it provides a convenient means of increasing the electromagnetic field emitted by the handset, thus improving hearing aid coupling performance. Second, as opposed to the voice coil of speaker 109 which must be mounted in a location that allows the speaker to be placed in close proximity to the user's ear, secondary flux coil 111 can be positioned to improve hearing aid coupling efficiency. For example, by locating coil 111 such that it will be above speaker 109 during normal use, the secondary coil is positioned closer to a behind-the-ear hearing aid than is the speaker. Third, by providing means for electromagnetically coupling to a hearing aid, secondary flux coil 111 frees up the handset designer to use speakers which would otherwise be unacceptable, for example sub-miniature speakers that generate a very small electromagnetic field.

Figure 2:
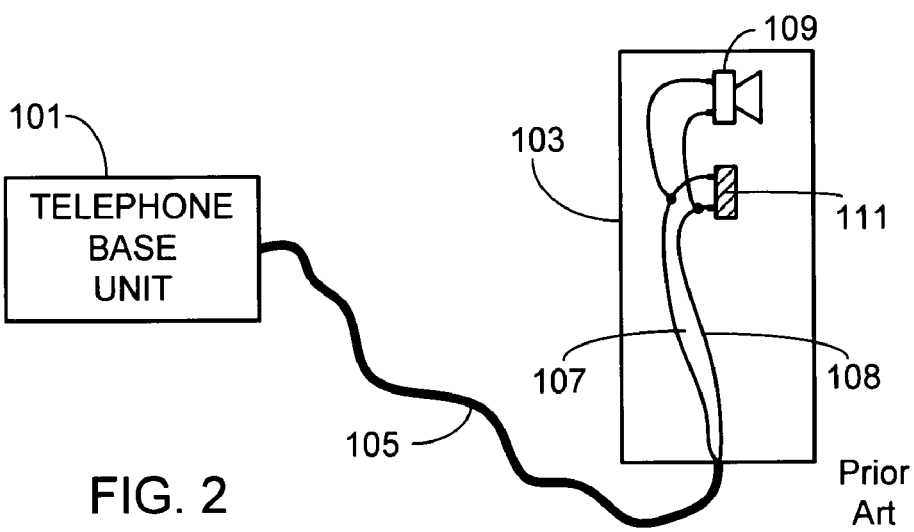
FIG. 2 illustrates a prior art technique of connecting a secondary flux coil in parallel with a speaker within a telephone handset.

In a conventional handset, secondary flux coil 111 can be connected in series with speaker 109, as illustrated in FIG. 1. Alternately, and as shown in FIG. 2, secondary flux coil 111 and speaker 109 can be connected in parallel. The advantage of the serial connection shown in FIG. 1 is that it reduces the impact of the additional coil on the phone line since it has minimal impact on the impedance of the receiver.

Figure 3:
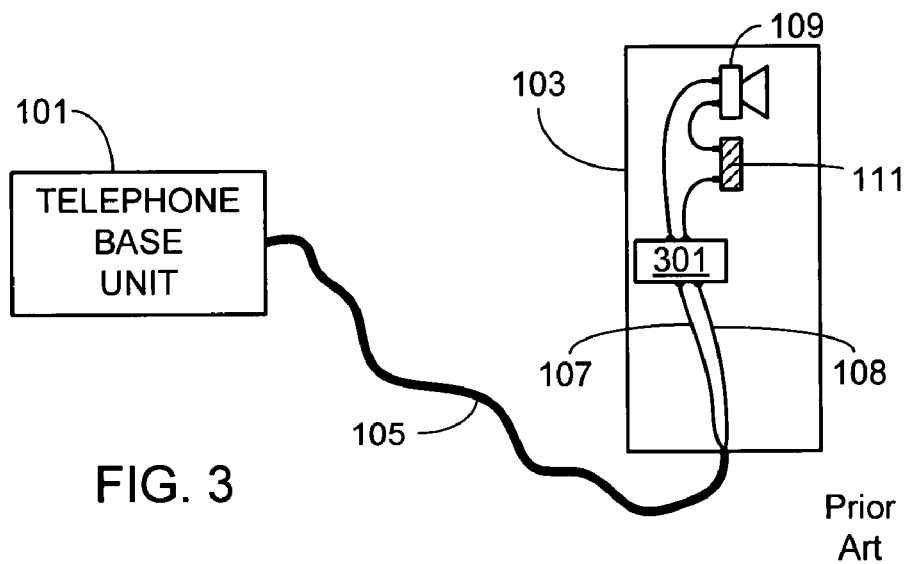
FIG. 3 illustrates a prior art technique of filtering the inputs to both a speaker and a secondary flux coil within a telephone handset.

It will be appreciated by those of skill in the art that there are innumerable speakers that can be used in handset 103, and that the sound quality of these speakers vary widely. Although to a degree, sound quality can be adjusted by the speaker enclosure and the means used to mount the speaker to the handset, typically sound quality optimization requires filtering or otherwise shaping the input signal to the speaker. Input signal shaping can be accomplished with any of a variety of different filters and/or digital signal processors (DSP), the filter being housed either in the handset (e.g., filter 301 in FIG. 3) or in the base unit (not shown). Unfortunately, filtering the input signal to the speaker can have an adverse effect on the performance of the secondary flux coil since according to the prior art both speaker 109 and secondary coil 111 utilize the same input signal.

As an example of the potentially adverse effects of filtering, take for an example a typical low acoustical impedance speaker (useful to minimize low frequency sound loss due to physical leaks where the ear pinna and handset abut) that exhibits a frequency response peak near 1500 Hz. If left untreated, the sound quality of such a speaker will be poor, sounding somewhat 'tinny'. Using simple filtering techniques, this speaker's response curve can be improved, flattening the undesired peak near 1500 Hz. Unfortunately, this same filter will cause a dip at this same frequency in the input signal to the secondary flux coil, resulting in a reduction in the output of the secondary flux coil and thus an unwanted reduction in the signal inductively coupled to the hearing aid within a portion of the frequency spectrum. It is noted that various industry and governmental standards and regulations specify a frequency mask or template to which the frequency spectrum of the time-varying magnetic field must be measured.

In accordance with the invention, in order to overcome this problem and allow optimization of both the output of speaker 109 and secondary flux coil 111, the input signals to speaker 109 and secondary flux coil 111 are independent. As a result of this configuration, one or both input signals can be independently shaped.

Figure 4:
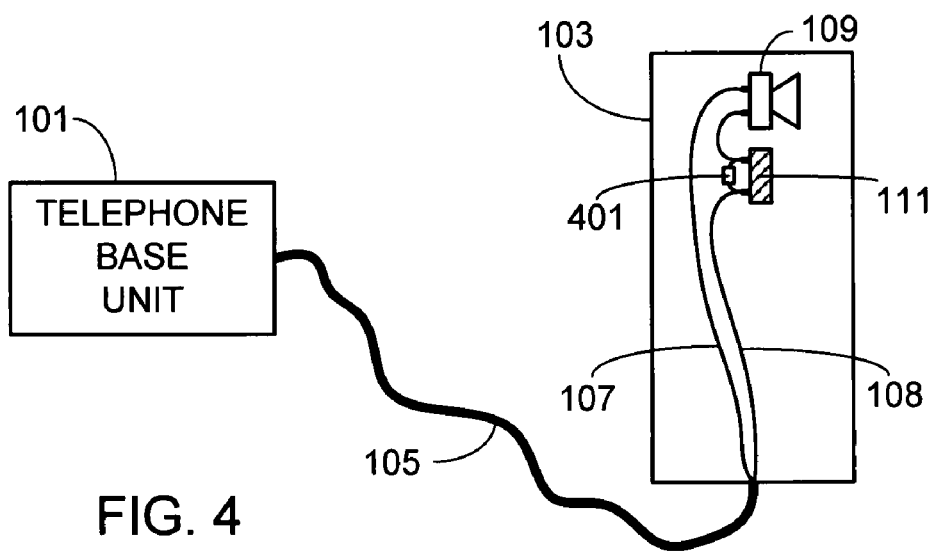
FIG. 4 illustrates a technique for filtering the input to the secondary flux coil of a handset without altering the input to the speaker that is serially connected to the secondary flux coil.

It will be appreciated that there are a number of possible embodiments of the present invention. FIG. 4 illustrates a preferred embodiment that only requires minimal changes within the handset and allows base unit 101 to remain unchanged. As shown, speaker 109 and secondary coil 111 are serially connected to the signal input lines 107/108. However, as opposed to shaping the input to both speaker 109 and coil 111, only the input signal to one of them is altered. In this illustration, the input to secondary flux coil 111 is altered by attaching a simple passive circuit 401 across the terminals of coil 111.

To illustrate the benefits of the invention, a simple example will be provided. Assuming that speaker 109 has an acoustical frequency response peak around 1500 Hz as previously described, and assuming that coil 111 has an advantageous relatively flat electromagnetic response as is common (curve 501 in FIG. 5), as previously noted a conventional system filter 301 would cause an undesired depression (not shown) in the electromagnetic output of coil 111. However, a simple passive circuit 401, further illustrated in FIG. 6, can be used to compensate for this depression, resulting in a dramatic improvement in the output of coil 111 (curve 503). In this exemplary embodiment, component 601 has a value of 2.2 mH, component 603 has a value of 4.5 ohms, and component 605 has a value of 14.7 µF. Of course, these values have been 'tuned' to the particular inductance (1 mH) and resistance (30 ohms) of secondary flux coil 111, but as mentioned earlier, many different variations on speaker selection are possible. Note that curve 505 of FIG. 5 represents the effects of circuit 401 on the output of coil 111 assuming filter 301 is not present in the system.

Figure 5:
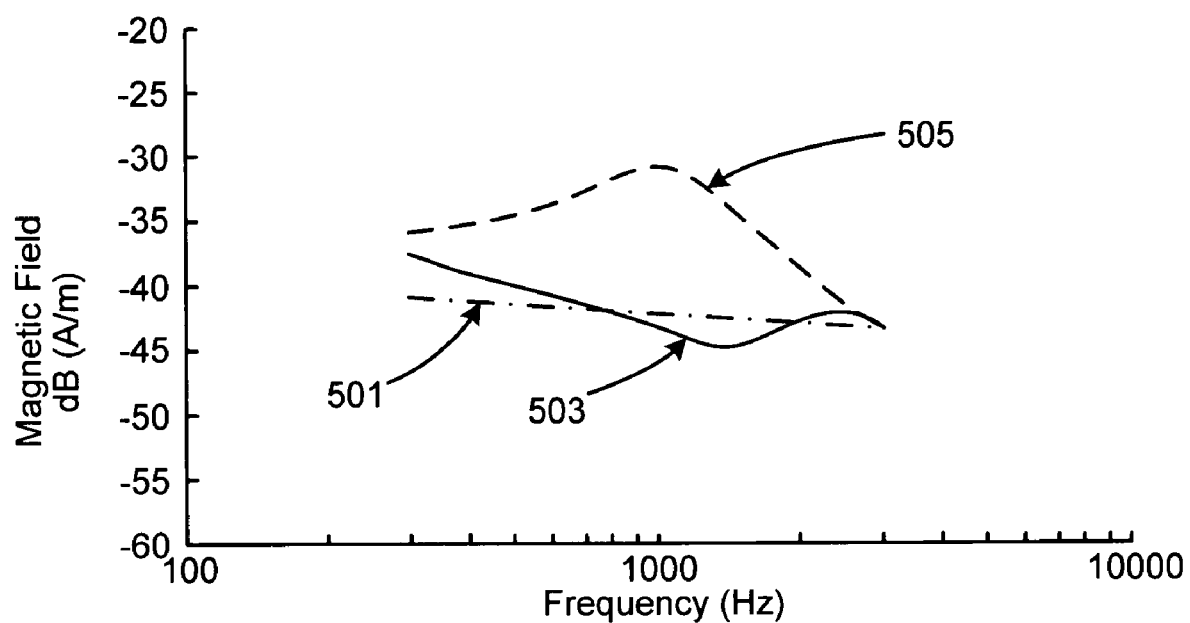
FIG. 5 graphically illustrates the benefits of one embodiment of the invention.
Figure 6:
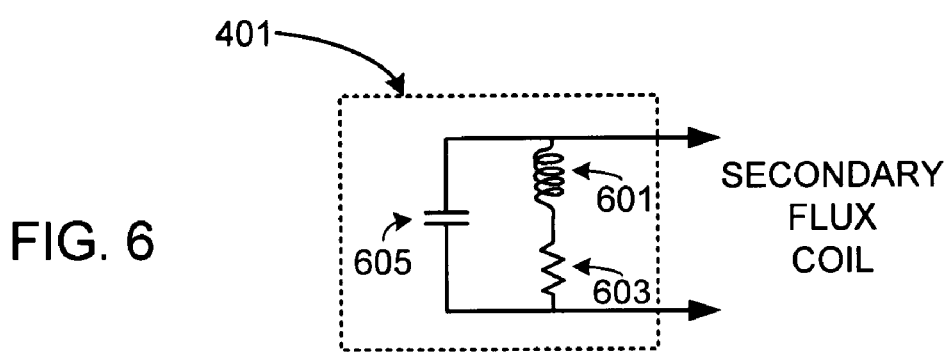
FIG. 6 illustrates a passive circuit that can be used with the invention.
Figure 7:
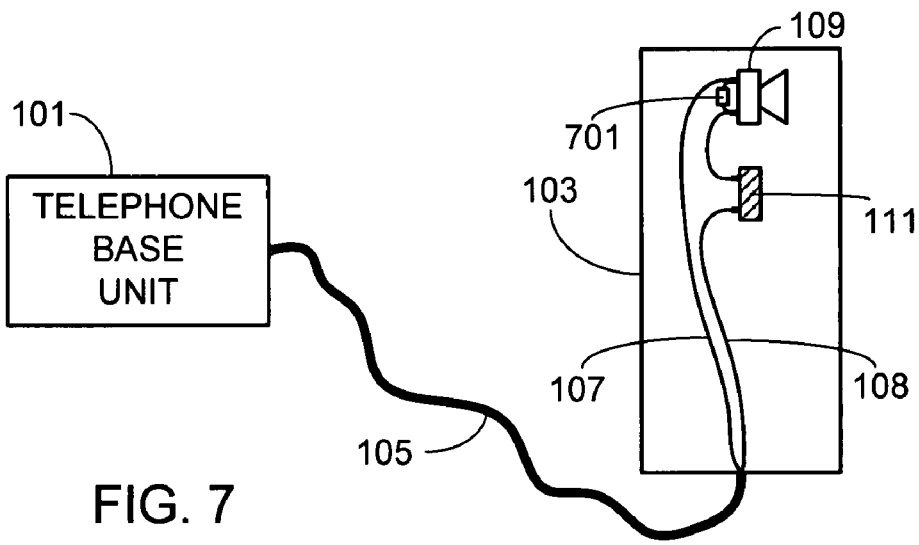
FIG. 7 illustrates a technique for filtering the input to the handset speaker without altering the input to the secondary flux coil that is serially connected to the speaker.
Figure 8:
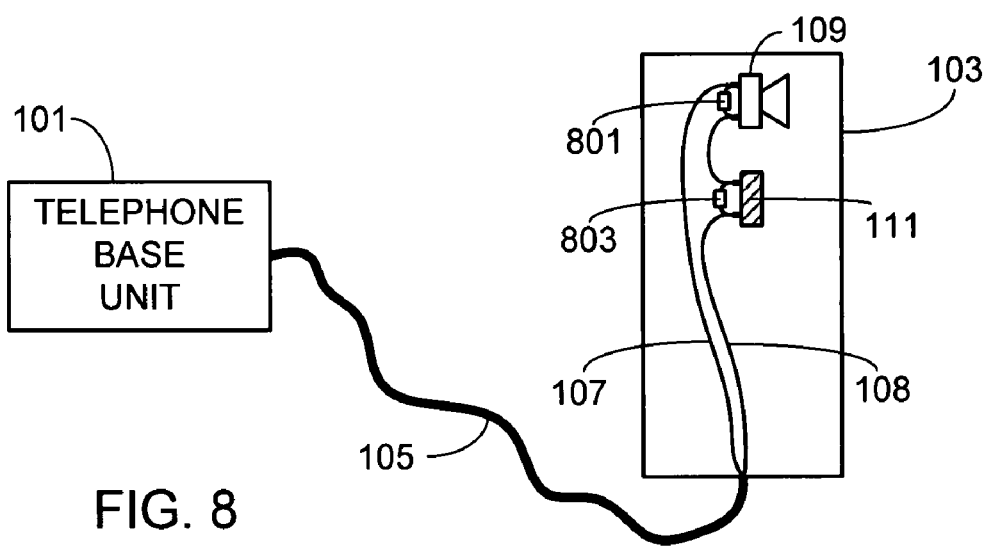
FIG. 8 illustrates a technique for independently filtering the inputs to both a handset speaker and a secondary flux coil, wherein the speaker is serially connected to the secondary flux coil.
Figure 9:
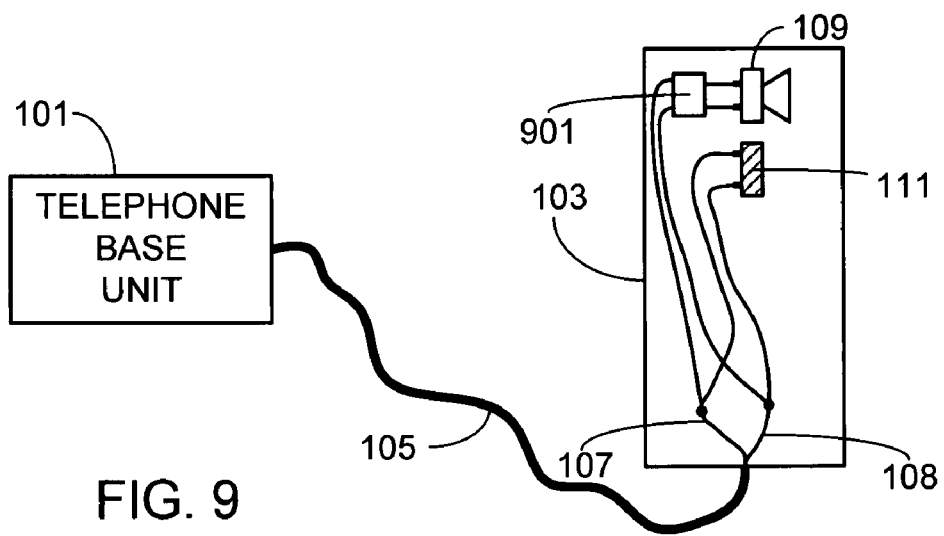
FIG. 9 illustrates a technique for filtering the input to the handset speaker without altering the input to the secondary flux coil that is connected in parallel with the speaker.
Figure 10:
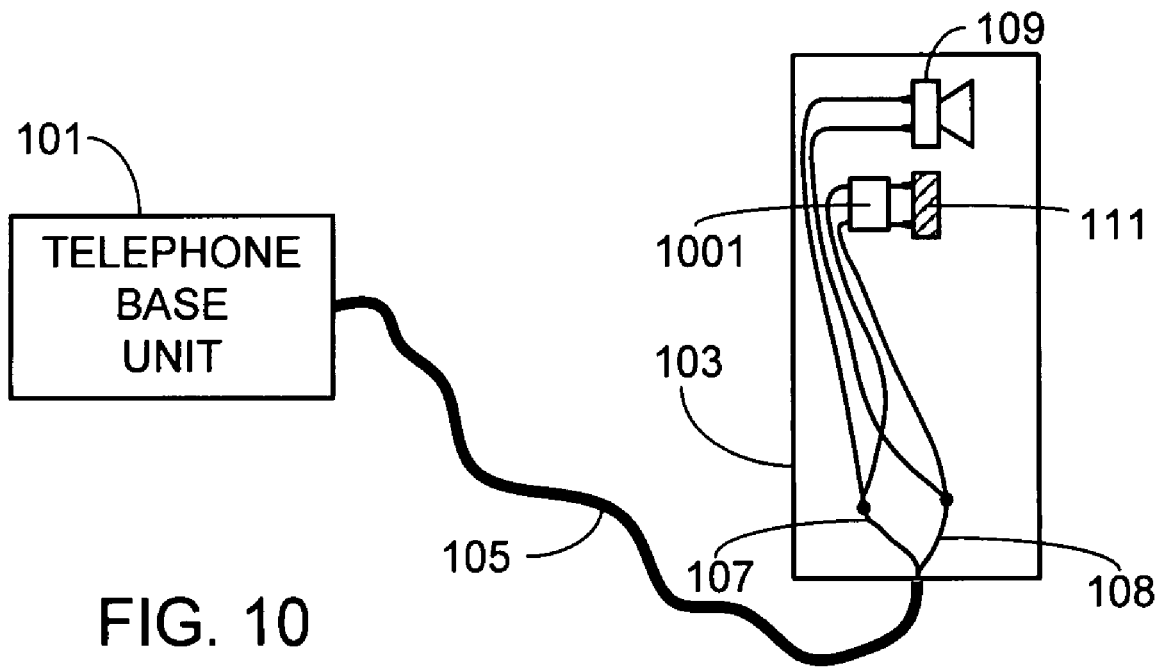
FIG. 10 illustrates a technique for filtering the input to the secondary flux coil without altering the input to the handset speaker that is connected in parallel with the secondary flux coil.
Figure 11:
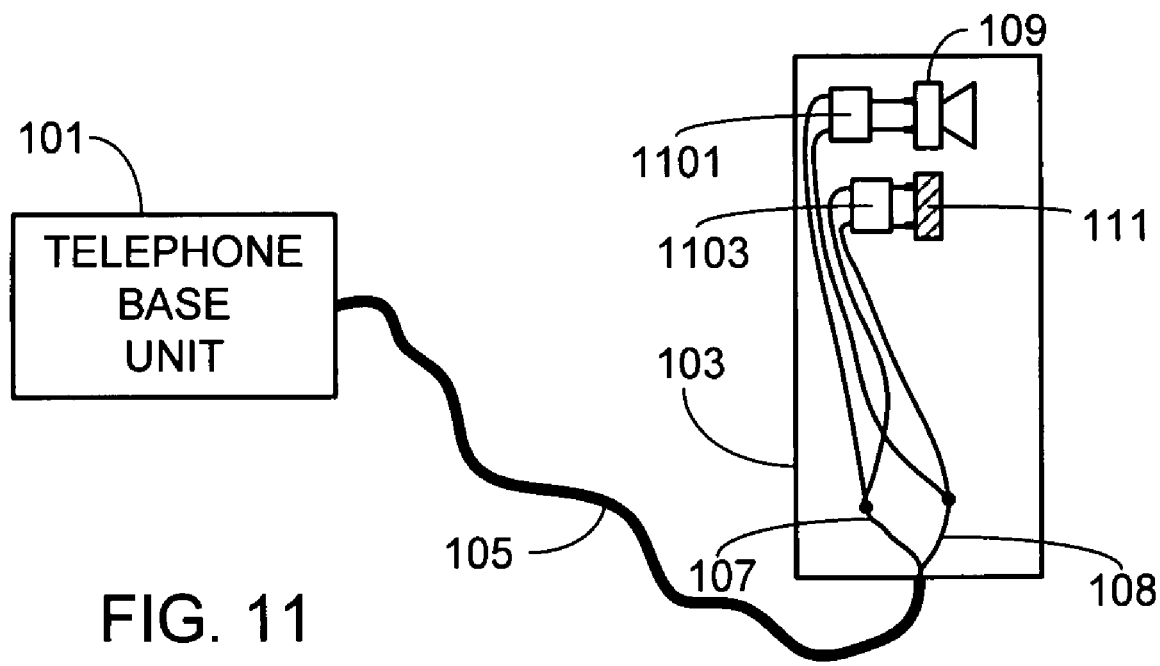
FIG. 11 illustrates a technique for independently filtering the inputs to both a handset speaker and a secondary flux coil, wherein the speaker is connected in parallel with the secondary flux coil.

It will be appreciated that the embodiment shown in FIG. 4, and described relative to FIGS. 5 and 6, is only one embodiment of the invention and the inventors clearly envision other embodiments. More specifically, there are numerous ways in which a filter can be coupled to the system of the invention, thereby affecting only the input signal to speaker 109 while having no effect on the input signal to secondary flux coil 111. Conversely, there are numerous ways in which a filter can be coupled to the system of the invention, thereby affecting only the input signal to secondary flux coil 111 while having no effect on the input signal to speaker 109. For example, instead of placing a circuit across the terminals of secondary flux coil 111, a circuit 701 can be placed across the terminals of speaker 109 as shown in FIG. 7. Alternately, a circuit 801 can be placed across the terminals of speaker 109 and a circuit 803 can be placed across the terminals of secondary flux coil 111 as shown in FIG. 8. Additionally, instead of connecting speaker 109 and secondary flux coil 111 together serially and then filtering one, or both, of the signal inputs, speaker 109 and secondary flux coil 111 can be connected in parallel. This is a particularly useful arrangement for digitally processing one, or both, input signals as illustrated in FIGS. 9-11. As shown in FIG. 9, a filter 901 (e.g., a DSP) is coupled into the input lines of speaker 109. Alternately, a filter 1001 (e.g., a DSP) can be coupled into the input lines of secondary flux coil 111 as shown in FIG. 10. Alternately, a filter 1101 (e.g., a DSP) can be coupled into the input lines of speaker 109 and a secondary filter 1103 (e.g., a DSP) can be coupled into the input lines of secondary flux coil 111 as shown in FIG. 11. It should be appreciated that the filters utilized in any of the embodiments shown in FIGS. 4 and 7-11 can also be housed within telephone base unit 101 although this would typically require replacement of cable 105 with either a five-wire or a six-wire cable due to the extra speaker/coil connections. It should also be appreciated that without departing from the invention, telephone base unit 101 and handset 103 can be combined into a single unit, for example as a means of improving the telephone's portability.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

What is claimed is:

1. A telephone comprising:
   a telephone base unit;
   a handset coupled to said telephone base unit, said handset comprising a speaker and a secondary flux coil;
   a first pair of signal lines electrically connected to said speaker, wherein said first pair of signal lines communicates a first input signal to said speaker;
   a second pair of signal lines electrically connected to said secondary flux coil, wherein said second pair of signal lines communicates a second input signal to said secondary flux coil; and
   a filter electrically connected to said first pair of signal lines and to said speaker, wherein said first input signal is different from said second input signal.

2. The telephone of claim 1, wherein said filter alters said first input signal and does not alter said second input signal.

3. The telephone of claim 1, wherein said filter is connected in parallel with said speaker.

4. The telephone of claim 1, wherein said filter is connected in series with said speaker, wherein said filter is electrically interposed between said speaker and said first pair of signal lines.

5. The telephone of claim 1, wherein said filter is comprised of a passive circuit.

6. The telephone of claim 1, wherein said filter is comprised of a digital signal processor.

7. The telephone of claim 1, further comprising a second filter electrically connected to said second pair of signal lines and to said secondary flux coil.

8. The telephone of claim 1, wherein said speaker is serially coupled to said secondary flux coil.

9. The telephone of claim 1, wherein said speaker is coupled in parallel with said secondary flux coil.

10. The telephone of claim 1, wherein said telephone base unit and said handset are combined into a single unit.

11. A telephone comprising:
    a telephone base unit;
    a handset coupled to said telephone base unit, said handset comprising a speaker and a secondary flux coil;
    a first pair of signal lines electrically connected to said speaker, wherein said first pair of signal lines communicates a first input signal to said speaker;
    a second pair of signal lines electrically connected to said secondary flux coil, wherein said second pair of signal lines communicates a second input signal to said secondary flux coil; and
    a filter electrically connected to said second pair of signal lines and to said secondary flux coil, wherein said first input signal is different from said second input signal.

12. The telephone of claim 11, wherein said filter alters said second input signal and does not alter said first input signal.

13. The telephone of claim 11, wherein said filter is connected in parallel with said secondary flux coil.

14. The telephone of claim 11, wherein said filter is connected in series with said secondary flux coil, wherein said filter is electrically interposed between said secondary flux coil and said second pair of signal lines.

15. The telephone of claim 11, wherein said filter is comprised of a passive circuit.

16. The telephone of claim 11, wherein said filter is comprised of a digital signal processor.

17. The telephone of claim 11, further comprising a second filter electrically connected to said first pair of signal lines and to said speaker.

18. The telephone of claim 11, wherein said secondary flux coil is serially coupled to said speaker.

19. The telephone of claim 11, wherein said secondary flux coil is coupled in parallel with said speaker.

20. The telephone of claim 11, wherein said telephone base unit and said handset are combined into a single unit.

* * * * *